(12) United States Patent
Appel et al.

(10) Patent No.: US 7,411,018 B2
(45) Date of Patent: Aug. 12, 2008

(54) RUBBER MIXTURE AND TIRE

(75) Inventors: Andrea Appel, Hannover (DE); Fabian Dettmer, Braunschweig (DE); Dietmar Soehnen, Lauenau (DE); Juergen Wagemann, Bad Salzdetfurth (DE)

(73) Assignee: Continental Aktiengesellschaft, Hannover (DE)

( * ) Notice: Subject to any disclaimer, the term of this patent is extended or adjusted under 35 U.S.C. 154(b) by 103 days.

(21) Appl. No.: 10/577,307

(22) PCT Filed: Nov. 1, 2004

(86) PCT No.: PCT/EP2004/052743

§ 371 (c)(1),
(2), (4) Date: Apr. 28, 2006

(87) PCT Pub. No.: WO2005/044909

PCT Pub. Date: May 19, 2005

(65) Prior Publication Data

US 2007/0135564 A1 Jun. 14, 2007

(30) Foreign Application Priority Data

Nov. 4, 2003 (EP) .................................. 03025180

(51) Int. Cl.
*C08L 9/00* (2006.01)
(52) U.S. Cl. ........................ 524/527; 524/493; 524/318; 524/575.5
(58) Field of Classification Search ................. 524/571, 524/493, 318, 575.5
See application file for complete search history.

(56) References Cited

U.S. PATENT DOCUMENTS

| 4,840,988 A | 6/1989 | Nakayama et al. |
| 2002/0045697 A1 | 4/2002 | Sohnen et al. |

FOREIGN PATENT DOCUMENTS

| DE | 3804908 | 8/1988 |
| EP | 0708137 | 4/1996 |
| EP | 1035164 | 9/2000 |
| EP | 1052270 | 11/2000 |
| EP | 1179560 | 2/2002 |
| WO | 99/09036 | 2/1999 |

OTHER PUBLICATIONS

J. Schnetger, Lexikon der Kautschuk-Technik, Hüthig Buch Verlag, 2nd Edition, Heidelberg, 1991, pp. 36-40, 155, 156, 601 and 602.

*Primary Examiner*—Robert D. Harlan
(74) *Attorney, Agent, or Firm*—Greenblum & Bernstein, P.L.C.

(57) ABSTRACT

The invention relates to a sulfur-vulcanizable rubber compound, in particular for treads of tires, which contains at least one diene rubber, liquid polybutadiene with a molecular weight of 1500-10000 g/mol and a vinyl content of 15-50%, at least one polar filler, at least one high-structure black with an iodine adsorption number of 115-200 g/kg and a DBP number of 125-160 mL/100 g and at least one glyceride and/or one factice for good abrasion characteristics, good wet traction and good traction on ice and snow with good dry braking at the same time.

20 Claims, No Drawings

RUBBER MIXTURE AND TIRE

FIELD OF THE INVENTION

The invention relates to a sulfur-vulcanizable rubber compound, in particular for tire treads, containing at least one diene rubber, at least one polar filler and carbon black. The invention further relates to a tire, the part of the tread of which that comes into contact with the road comprises at least in part the sulfur-vulcanized rubber compound.

BACKGROUND INFORMATION

Since the driving properties of a tire, in particular a vehicle pneumatic tire, depend to a large extent on the rubber composition of the tread, particularly high demands are made on the composition of the tread compound. In recent years the overall level of driving properties has been raised by the partial or complete replacement of the filler carbon black by silicic acid in rubber compounds. However, the known conflicts of objectives of the conflicting tire properties also still persist with tread compounds containing silicic acid. As a rule an improvement in wet traction and dry braking thus still entails a deterioration in rolling resistance, winter properties and abrasion characteristics.

Many approaches have already been pursued to resolve these conflicts of objectives. Thus, for example, diverse, also modified polymers, resins, softeners and highly dispersed fillers for rubber compounds have been used and attempts have been made to influence the vulcanized material properties by modifying the compound production.

For example, tread compounds are known from EP-A-1 052 270 which contain, i.a., a liquid polymer, e.g., polybutadiene for a good grip on ice. Tread compounds are likewise known from DE 38 04 908 A1 that contain liquid polybutadiene for good winter properties. Liquid polybutadiene with a high vinyl content is also proposed in EP-A-1 035 164 for tire treads as a replacement for conventional processing oils. However, the use of liquid polybutadiene in conventional compounds has a very negative effect on the dry braking of tires.

SUMMARY OF THE INVENTION

The object of the present invention is now to provide rubber compounds for the treads of tires which cause the tires to have good abrasion characteristics, good wet traction and a good traction on ice and snow with good dry braking at the same time. A particularly high overall level is to be achieved for these properties.

This object is attained according to the invention in that the rubber compound contains
  At least one diene rubber,
  Liquid polybutadiene with a molecular weight of 1500-10000 g/mol and a vinyl content of 15-50%,
  At least one polar filler,
  At least one high-structure black with an iodine adsorption number of 115-200 g/kg and a DBP number of 125-160 mL/100 g and
  At least one glyceride and/or a factice.

The present invention provides a sulfur-vulcanizable rubber compound, formed by combining at least the following:
  at least one diene rubber;
  liquid polybutadiene with a molecular weight of 1500-10000 g/mol and a vinyl content of 15-50%;
  at least one polar filler;
  at least one high-structure carbon black with an iodine adsorption number of 115-200 g/kg and a DBP number of 125-160 mL/100 g; and
  at least one glyceride and/or factice.

The at least one diene rubber can comprise at least one diene rubber selected from at least one of natural rubber, synthetic polyisoprene, polybutadiene and styrene-butadiene copolymer.

The liquid polybutadiene can have a molecular weight of 2000-5000 g/mol and a vinyl content of 20-35%.

The rubber compound can include 10-50 parts by weight liquid polybutadiene per 100 parts by weight of the at least one diene rubber, and the at least one diene rubber can comprise at least one of natural rubber, synthetic polyisoprene, polybutadiene and styrene-butadiene copolymer.

The at least one polar filler can comprise silicic acid, and the weight ratio of silicic acid to high-structure carbon black in the rubber compound can be 10:1 to 1:2.

The rubber compound can include 10-70 parts by weight high-structure carbon black per 100 parts by weight of the at least one diene rubber, and the at least one diene rubber can comprise at least one of natural rubber, synthetic polyisoprene, polybutadiene and styrene-butadiene copolymer.

The at least one at least one glyceride and/or a factice can comprise at least one glyceride, and the at least one glyceride can contain rape-seed oil in an amount of 5-10 parts by weight per 100 parts by weight of the at least one diene rubber, and the at least one diene rubber can comprise at least one of natural rubber, synthetic polyisoprene, polybutad iene and styrene-butadiene copolymer.

The rubber compound can be formed by combining at least the following:
  10-80 parts by weight natural rubber;
  10-50 parts by weight liquid polybutadiene;
  20-110 parts by weight silicic acid;
  10-70 parts by weight high-structure carbon black; and
  5-20 parts by weight rape-seed oil.

The invention is also directed to a tire comprising a tread rubber that is adapted to come into contact with a road, the tread rubber-comprising at least in part a sulfur-vulcanized rubber compound according to the present invention, and the rubber compound can be a tire tread, and the rubber compound can be vulcanized.

The rubber compound can include combining at least the following:
  up to 70 parts by weight polybutadiene; and
  parts by weight of natural rubber and polybutadiene add up to 100.

The rubber compound can include combining at least the following:
  up to 80 parts by weight solution-polymerized styrene-butadiene copolymer; and
  parts by weight of natural rubber and solution-polymerized styrene-butadiene copolymer add up to 100.

The liquid polybutadiene can have a molecular weight of 2000-5000 g/mol and a vinyl content of 20-35%.

The rubber compound can include 10-50 parts by weight liquid polybutadiene per 100 parts by weight of the at least one diene rubber.

The at least one polar filler can comprise silicic acid, and the weight ratio of silicic acid to high-structure carbon black in the rubber compound can be 10:1 to 1:2.

The rubber compound can include 10-70 parts by weight high-structure carbon black per 100 parts by weight of the at least one diene rubber.

DETAILED DESCRIPTION OF THE INVENTION

Surprisingly, it was found that the disadvantage of the deterioration in dry braking, which usually occurs through the incorporation of liquid polybutadiene into the compounds, is fully compensated for through the special combination of liquid polybutadiene with high-structure black and glyceride and/or factice in diene rubber compounds containing filler. The other cited tire properties thereby remain at a high level.

The sulfur-vulcanizable rubber compound contains at least one diene rubber, whereby liquid polybutadiene should not be considered a diene rubber within the terms of the application. Diene rubbers include all rubbers with an unsaturated carbon chain that is derived, at least partially, from conjugated dienes. It is particularly preferred for the diene rubber or the diene rubbers to be chosen from the group comprising natural rubber (NR), synthetic polyisoprene (IR), polybutadiene (BR) and styrene-butadiene copolymer (SBR). These diene elastomers are easy to process into the rubber compound according to the invention and produce good tire properties in the vulcanized tires.

The rubber compound can contain polyisoprene (IR, NR) as diene rubber. This can thereby be both cis-1,4-polyisoprene and 3,4-polyisoprene. However, the use of cis-1,4-polyisoprene with a cis-1,4 content >90% by weight is preferred. On the one hand, such a polyisoprene can be obtained through stereo-specific solution polymerization with Ziegler-Natta catalysts or by using finely dispersed lithium alkyls. On the other hand, natural rubber (NR) is such a cis-1,4-polyisoprene, the cis-1,4 content in natural rubber is greater than 99% by weight.

If the rubber compound contains polybutadiene (BR) as diene rubber, this can thereby be both cis-1,4 and vinyl polybutadiene (40-90% by weight vinyl content). The use of cis-1,4 polybutadiene with a cis-1,4 content greater than 90% by weight is preferred, which can be produced, e.g., by solution polymerization in the presence of catalysts of the rare earth type.

The styrene-butadiene copolymer can be solution-polymerized styrene-butadiene copolymer (S-SBR) with a styrene content, based on the polymer, of approx. 10 to 45% by weight and a vinyl content (content of 1,2-bonded butadiene, based on the total polymer) of 10 to 70% by weight, which can be produced, e.g., using lithium alkyls in organic solvents. The S-SBR can also be coupled and endgroup-modified. However, emulsion-polymerized styrene-butadiene copolymer (E-SBR) and mixtures of E-SBR and S-SBR can also be used. The styrene content of the E-SBR is approx. 15 to 50% by weight, and the types known from the prior art, which were obtained by copolymerization of styrene and 1,3-butadiene in aqueous emulsion, can be used.

However, in addition to the diene rubbers mentioned, the mixture can also contain other types of rubber as well, such as, e.g., styrene-isoprene-butadiene terpolymer, butyl rubber, halobutyl rubber or ethylene-propylene-diene rubber (EPDM).

The rubber compound contains liquid polybutadiene with a molecular weight of 1500-10000 g/mol and a vinyl content of 15-50%. Preferably liquid polybutadiene with a molecular weight of 2000-5000 g/mol and a vinyl content of 20-35% is used, e.g., Ricon® 130, Ricon Resins Inc., USA. With this type of liquid polybutadiene particularly good abrasion characteristics with good winter properties are achieved. At the same time the liquid polybutadiene acts in a viscosity-reducing manner, so that the amount of other softeners can be reduced.

The liquid polybutadiene is preferably used in amounts of 10-50 parts by weight, particularly preferably in amounts of 15-30 parts by weight, per 100 parts by weight of the diene rubber(s), selected from the group comprising natural rubber, synthetic polyisoprene, polybutadiene and styrene-butadiene copolymer, in order to achieve an optimal effect with regard to all the tire properties at a suitable price.

The rubber compound contains at least one polar filler. All the fillers known to one skilled in the art, such as aluminum hydroxide and layered silicates, can be used as a polar filler. However, silicic acid is preferably used as a polar filler, whereby the weight ratio of silicic acid to high-structure black in the compound is 10:1 to 1:2. The silicic acid can be used in amounts of 20-110 parts by weight, preferably in amounts of 70-90 parts by weight, per 100 parts by weight of the diene rubber(s), selected from the group comprising natural rubber, synthetic polyisoprene, polybutadiene and styrene-butadiene copolymer. The silicic acids can be the silicic acids known to one skilled in the art, which are suitable as fillers for tire rubber compounds. However, it is particularly preferred if a finely dispersed, precipitated silicic acid is used which has a nitrogen surface (BET surface) (in accordance with DIN 66131 and 66132) of 35 to 350 $m^2/g$, preferably 145 to 270 $m^2/g$ and a CTAB surface (in accordance with ASTM D 3765) of 30 to 350 $m^2/g$, preferably 120 to 285 $m^2/g$. Silicic acids of this type lead, e.g., in rubber compounds for tire treads to particularly good physical properties of the vulcanized materials. Moreover, advantages can result in the mixture processing through a reduction of the mixing time with constant product properties, which lead to improved productivity. Thus both, e.g., those of the VN3 (trade name) type by Degussa and highly dispersed silicic acids, so-called HD silicic acids (e.g., Ultrasil 700 by Degussa) can be used as silicic acids.

Silane coupling agents can be used in rubber compounds to improve processability and to bond the polar filler, in particular the silicic acid, to the diene rubber. The silane coupling agents react with the surface silanol groups of the silicic acid or other polar groups during the mixing of the rubber or the rubber compound (in situ) or already before the addition of the filler to the rubber for the purpose of a pretreatment (pre-modification). All the silane coupling agents known to one skilled in the art for use in rubber compounds can thereby be used as silane coupling agents. Such coupling agents known from the prior art are bifunctional organosilanes having at least one alkoxy, cycloalkoxy, or phenoxy group as leaving group on the silicon atom and comprising, as further functionality, a group that is capable of undergoing a chemical reaction with the double bonds of the polymer, optionally after cleavage. The latter group may, for example, be the following chemical groups: —SCN, —SH, —$NH_2$, or —$S_x$— (with x=2-8). Thus as silane coupling agents can be used, e.g., 3-mercaptopropyl triethoxysilane, 3-thiocyanatopropyl trimethoxysilane or 3,3'-bis(triethoxysilylpropyl) polysulfide with 2 to 8 sulfur atoms, such as, e.g., 3,3'-bis (triethoxysilylpropyl) tetrasulfide (TESPT), the corresponding disulfide or also mixtures of the sulfides with 1 to 8 sulfur atoms having different contents of the various sulfides. TESPT can also thereby be added, for example, as a blend with industrial carbon black (trade name X50S by Degussa). Blocked mercaptosilanes, such as are known, e.g., from WO 99/09036, can also be used as silane coupling agents.

The silane coupling agents are used in amounts of 0.2 to 30 parts by weight, preferably 1 to 15 parts by weight, based on 100 parts by weight filler, in particular silicic acid, since then an optimal bonding of the fillers to the rubber or rubbers can occur.

The rubber compound according to the invention contains at least one high-structure black with an iodine adsorption number (in accordance with ASTM D 1510) of 115-200 g/kg and a DBP number (in accordance with ASTM D 2414) of 125-160 mL/100 g. For example, a black of the HV 3396 type, Columbian Chemicals Company, USA, can be used.

Preferably 10-70 parts per weight, particularly preferably 10-20 parts per weight high-structure black per 100 parts per weight of the diene rubber(s), selected from the group comprising natural rubber, synthetic polyisoprene, polybutadiene and styrene-butadiene copolymer are incorporated into the compound in order to achieve a particularly good dry braking in tires.

The rubber compound according to the invention further contains at least one glyceride (ester of glycerol) and/or a factice. These substances act as softeners and can completely or partially replace conventional softeners in the compound. Natural triglycerides of vegetable or animal origin that are environmentally safe can be used as glycerides. Factices are reaction products or cross-linked products of unsaturated animal, vegetable or synthetic oils (e.g., rape-seed oil or castor oil) with sulfur, hydrogen sulfide, disulfur chloride, silicon tetrachloride or diisocyanate. For further details, see by way of example J. Schnetger, Lexikon der Kautschuk-Technik, Hüthig Buch Verlag, $2^{nd}$ Edition, Heidelberg, 1991.

According to an advantageous further development of the invention, the compound has as glyceride cost-effective and easily processable rape-seed oil in an amount of 5-10 parts by weight per 100 parts by weight of the diene rubber(s), selected from the group comprising natural rubber, synthetic polyisoprene, polybutadiene and styrene-butadiene copolymer.

A mixture preferably used for a particularly high level of the "abrasion," "dry and wet braking" and "traction on ice and snow" tire properties contains:

10-80 parts by weight natural rubber,
0-70 parts by weight polybutadiene,
0-80 parts by weight solution-polymerized styrene-butadiene copolymer,
10-50 parts by weight liquid polybutadiene
20-110 parts by weight silicic acid,
10-70 parts by weight high-structure black and
5-20 parts by weight rape-seed oil, whereby the parts by weight of natural rubber, polybutadiene and solution-polymerized styrene-butadiene copolymer add up to 100.

Apart from the substances mentioned, the rubber compound can also have other additives, e.g., fillers, such as, e.g., alumosilicates, chalk, starch, magnesium oxide, titanium dioxide or rubber gels, and other softeners, such as, e.g., aromatic, naphthenic or paraffinic mineral oil softeners (e.g., MES (mild extraction solvate) or TDAE (treated distillate aromatic extract).

Furthermore, the rubber compound according to the invention can contain conventional additives in conventional parts by weight. These additives include anti-aging agents, such as, e.g., N-phenyl-N'-(1,3-dimethylbutyl)-p-phenylenediamine (6PPD), N-isopropyl-N'-phenyl-p-phenylenediamine (IPPD), 2,2,4-trimethyl-1,2-dihydroquinoline (TMQ), and other substances such as those known, e.g., from J. Schnetger, Lexikon der Kautschuktechnik, 2nd Edition, Hüthig Buch Verlag, Heidelberg, 1991, pp. 42-48, activating agents such as, e.g., zinc oxide and fatty acids (e.g., stearic acid), waxes, resins and mastication aids such as, e.g., 2,2'-dibenzamido-diphenyldisulfide (DBD).

The vulcanization is performed in the presence of sulfur or sulfur donors, whereby some sulfur donors can simultaneously act as vulcanization accelerators. In the last mixing step, sulfur and sulfur donors are added to the rubber compound in the amounts customary for one skilled in the art (0.4 to 4 phr sulfur, preferably in amounts of 1.5 to 2.5 phr).

The rubber compound furthermore can contain substances influencing the vulcanization in conventional amounts, such as vulcanization accelerators, vulcanization retarders, and vulcanization activators, in order to control the required time and/or the required temperature of the vulcanization and to improve the characteristics of the vulcanized material. The vulcanization accelerators can thereby be selected, for example, from the following groups of accelerators: thiazole accelerators, such as, e.g., 2-mercaptobenzothiazole, sulfenamide accelerators, such as, e.g., benzothiazyl-2-cyclohexyl sulfenamide (CBS), guanidine accelerators, such as, e.g., N,N'-diphenyl guanidine (DPG), dithiocarbamate accelerators, such as, e.g., zinc dibenzyldithiocarbamate, disulfides. The accelerators can also be used in combination with one another, which may result in synergistic effects.

Depending on the amount of liquid polybutadiene used, it can be appropriate to adjust the amount of the vulcanization system of sulfur and substance influencing the vulcanization, since the liquid polybutadiene is in part irreversibly integrated into the matrix.

The production of the rubber compound according to the invention is carried out in a conventional manner, whereby, as a rule, first a basic compound, containing all the constituents with the exception of the vulcanization system (sulfur and substances influencing the vulcanization), is produced in one or more mixing steps, and then the finished compound is produced by the addition of the vulcanization system. Subsequently, the compound is further processed, e.g., by means of an extrusion process, and shaped into the corresponding form. The compound is preferably shaped into the form of a tread. A tread rubber compound blank produced in this manner is applied in a known manner during the production of the green cover, in particular, a vehicle pneumatic green cover. However, the tread rubber in the form of a narrow rubber compound strip, may also be wound onto a green cover already having all tire parts except for the tread rubber. After the vulcanization of the vehicle tire, the tire shows good abrasion characteristics, good wet traction and good traction on ice and snow with good dry braking at the same time. It is irrelevant for the tires whether the entire tread rubber has been made from a single compound or has, e.g., a cap and base structure; for it is important that at least the surface that comes into contact with the road has been made from the rubber compound according to the invention.

EXAMPLES

The invention is now described on the basis of comparative examples and exemplary embodiments that are explained in more detail in Tables 1 through 3.

The comparison compounds are labeled V, the compound according to the invention is labeled E. The compounds 1 through 6 differ only in type and amount of the following substances: liquid polybutadiene, black, processing oil and rape-seed oil. In the compounds with liquid polybutadiene, the amount of softening oils is reduced compared to compounds 1 and 2, since the liquid polybutadiene already has a viscosity-reducing effect.

TABLE 1

| Constituents | Unit | 1(V) | 2(V) | 3(V) | 4(V) | 5(V) | 6(E) |
|---|---|---|---|---|---|---|---|
| Natural rubber | pbw | 30 | 30 | 30 | 30 | 30 | 30 |
| BR[a] | pbw | 40 | 40 | 40 | 40 | 40 | 40 |
| S-SBR[b] | pbw | 30 | 30 | 30 | 30 | 30 | 30 |
| Liquid polybutadiene[c] | pbw | — | — | 20 | 20 | 20 | 20 |
| Black N339 | pbw | 14 | — | 14 | — | 14 | — |
| Black HV3396 | pbw | — | 14 | — | 14 | — | 14 |
| Silicic acid[d] | pbw | 87 | 87 | 87 | 87 | 87 | 87 |
| Processing oil | pbw | 42 | 42 | 22 | 22 | 12 | 12 |
| Rape-seed oil | pbw | — | — | — | — | 10 | 10 |
| Anti-aging agent | pbw | 6 | 6 | 6 | 6 | 6 | 6 |
| Zink oxide | pbw | 5 | 5 | 5 | 5 | 5 | 5 |
| Stearic acid | pbw | 2 | 2 | 2 | 2 | 2 | 2 |
| Processing aid | pbw | 5 | 5 | 5 | 5 | 5 | 5 |
| Silane coupling agent | pbw | 6 | 6 | 6 | 6 | 6 | 6 |
| Accelerator | pbw | 4 | 4 | 4 | 4 | 4 | 4 |
| Sulfur | pbw | 1.5 | 1.5 | 1.5 | 1.5 | 1.5 | 1.5 |

[a]High-cis polybutadiene
[b]Solution-polymerized styrene-butadiene copolymer, VSL-5025, Bayer AG, Germany
[c]Molecular weight: 2500 g/mol, vinyl content: 20-35%, Ricon ® 130, Ricon Resins Inc., USA
[d]Silica VN 3, Degussa, Germany The compound production took place under customary conditions in two stages in a laboratory tangential mixer. Test specimens were produced from all the compounds under pressure at 160° C. through optimal vulcanization and typical material properties for the rubber industry, which are listed in Table 2, were determined with these test specimens. The following test procedures were used for the tests on test specimens:

Tensile strength at room temperature according to DIN 53 504

Elongation at tear at room temperature according to DIN 53 504

Tensile moduli at 100, 200, and 300% elongation at room temperature according to DIN 53 504

Breaking energy density determined in tensile test according to DIN 53 504, whereby the breaking energy density is the work necessary until break, based on the volume of the specimen Shore A hardness at room temperature and 70° C. according to DIN 53 505

Rebound elasticity at room temperature and at 70° C. according to DIN 53 512

TABLE 2

| Properties | Unit | 1(V) | 2(V) | 3(V) | 4(V) | 5(V) | 6(E) |
|---|---|---|---|---|---|---|---|
| Tensile strength at RT | MPa | 13.9 | 13.7 | 14.1 | 13.9 | 14.7 | 13.5 |
| Elongation at tear at RT | % | 615 | 670 | 682 | 571 | 590 | 593 |
| Tensile modulus 100% | MPa | 1.55 | 1.40 | 1.47 | 1.42 | 1.78 | 1.68 |
| Tensile modulus 200% | MPa | 3.57 | 3.08 | 3.34 | 3.10 | 4.08 | 3.78 |
| Tensile modulus 300% | MPa | 6.22 | 5.45 | 6.11 | 5.60 | 7.01 | 6.47 |
| Breaking energy density | J/cm³ | 35.3 | 37.9 | 39.4 | 32.8 | 36.2 | 33.5 |
| Shore A hardness at RT | Shore A | 60.1 | 61.4 | 59.1 | 60.9 | 58.5 | 60.3 |
| Shore A hardness at 70° C. | Shore A | 56.1 | 57.3 | 54.4 | 57.0 | 54.1 | 56.1 |
| Rebound elasticity at RT | % | 32.1 | 30.4 | 32.7 | 30.7 | 32.3 | 31.2 |
| Rebound elasticity at 70° C. | % | 44.4 | 41.5 | 41.5 | 43.7 | 42.9 | 42.7 |

Furthermore, vehicle pneumatic tires of dimension 205/55 R16 with a tread rubber cap were produced from the compounds listed in Table 1 and tests were carried out with the tires for wet braking on asphalt and concrete and dry braking as well as braking on snow and ice. Furthermore, the abrasion was measured. The tire properties of the tire with the compound 1 were equated with 100, values greater than 100 mean an improvement in the corresponding property (rating). The results of the tests are shown in Table 3.

TABLE 3

| Properties from tire test | 1(V) | 2(V) | 3(V) | 4(V) | 5(V) | 6(E) |
|---|---|---|---|---|---|---|
| Wet braking with ABS on asphalt | 100 | 102 | 99 | 100 | 101 | 101 |
| Wet braking with ABS on concrete | 100 | 100 | 98 | 99 | 98 | 101 |
| Dry braking | 100 | 100 | 95 | 101 | 94 | 102 |
| Ice braking (shed) | 100 | 96 | 100 | 94 | 102 | 102 |
| Snow traction | 100 | 95 | 99 | 96 | 101 | 101 |
| Abrasion | 100 | 105 | 110 | 123 | 109 | 124 |

Table 3 shows that only through the special combination of liquid polybutadiene with high-structure black and rape-seed oil in a diene rubber compound containing silicic acid can tires be obtained that are characterized by good braking on wet, dry, icy and snowy roads with particularly low abrasion, i.e., with very good abrasion characteristics. Although compound 6 contains liquid polybutadiene, it does not exhibit the deterioration of dry braking, as is evident, e.g., in compound 5. In particular the good performance in dry braking and in the winter properties was not to be anticipated based on the individual effects of the different substances.

The invention claimed is:

1. Sulfur-vulcanizable rubber compound, formed by combining at least the following:
   at least one diene rubber;
   liquid polybutadiene with a molecular weight of 1500-10000 g/mol and a vinyl content of 15-50%;
   at least one polar filler;
   at least one high-structure carbon black with an iodine adsorption number of 115-200 g/kg and a DBP number of 125-160 mL/100 g; and
   at least one glyceride and/or factice.

2. The rubber compound according to claim 1, wherein the at least one diene rubber comprises at least one diene rubber selected from at least one of natural rubber, synthetic polyisoprene, polybutadiene and styrene-butadiene copolymer.

3. The rubber compound according to claim 1, wherein the liquid polybutadiene has a molecular weight of 2000-5000 g/mol and a vinyl content of 20-35%.

4. The rubber compound according to claim 1, wherein the rubber compound includes 10-50 parts by weight liquid polybutadiene per 100 parts by weight of the at least one diene rubber, the at least one diene rubber comprising at least one of natural rubber, synthetic polyisoprene, polybutadiene and styrene-butadiene copolymer.

5. The rubber compound according to claim 1, wherein the at least one polar filler comprises silicic acid, and the weight ratio of silicic acid to high-structure carbon black in the rubber compound is 10:1 to 1:2.

6. The rubber compound according to claim 1, wherein the rubber compound includes 10-70 parts by weight high-structure carbon black per 100 parts by weight of the at least one diene rubber, the at least one diene rubber comprising at least one of natural rubber, synthetic polyisoprene, polybutadiene and styrene-butadiene copolymer.

7. The rubber compound according to claim 1, wherein the at least one at least one glyceride and/or a factice comprises at least one glyceride, and the at least one glyceride contains rape-seed oil in an amount of 5-10 parts by weight per 100 parts by weight of the at least one diene rubber, the at least one diene rubber comprising at least one of natural rubber, synthetic polyisoprene, polybutadiene and styrene-butadiene copolymer.

8. The rubber compound according to claim 1, wherein the rubber compound is formed by combining at least the following:
    10-80 parts by weight natural rubber;
    10-50 parts by weight liquid polybutadiene;
    20-110 parts by weight silicic acid;
    10-70 parts by weight high-structure carbon black; and
    5-20 parts by weight rape-seed oil.

9. A tire comprising a tread rubber that is adapted to come into contact with a road, the tread rubber comprising at least in part a sulfur-vulcanized rubber compound according to claim 1.

10. The rubber compound according to claim 1, comprising a tire tread.

11. The rubber compound according to claim 1, wherein the rubber compound is vulcanized.

12. The rubber compound according to claim 8, further including combining at least the following:
    up to 70 parts by weight polybutadiene; and
    parts by weight of natural rubber and polybutadiene add up to 100.

13. The rubber compound according to claim 8, further including combining at least the following:
    up to 80 parts by weight solution-polymerized styrene-butadiene copolymer; and
    parts by weight of natural rubber and solution-polymerized styrene-butadiene copolymer add up to 100.

14. The rubber compound according to claim 8, further including combining at least the following:
    up to 70 parts by weight polybutadiene;
    up to 80 parts by weight solution-polymerized styrene-butadiene copolymer; and
    parts by weight of natural rubber, polybutadiene and solution-polymerized styrene-butadiene copolymer add up to 100.

15. The rubber compound according to claim 2, wherein the liquid polybutadiene has a molecular weight of 2000-5000 g/mol and a vinyl content of 20-35%.

16. The rubber compound according to claim 2, wherein the rubber compound includes 10-50 parts by weight liquid polybutadiene per 100 parts by weight of the at least one diene rubber.

17. The rubber compound according to claim 2, wherein the at least one polar filler comprises silicic acid, and the weight ratio of silicic acid to high-structure carbon black in the rubber compound is 10:1 to 1:2.

18. The rubber compound according to claim 2, wherein the rubber compound includes 10-70 parts by weight high-structure carbon black per 100 parts by weight of the at least one diene rubber.

19. The rubber compound according to claim 2, wherein the at least one at least one glyceride and/or a factice comprises at least one glyceride, and the at least one glyceride contains rape-seed oil in an amount of 5-10 parts by weight per 100 parts by weight of the at least one diene rubber.

20. The rubber compound according to claim 3, wherein the liquid polybutadiene has a molecular weight of 2000-5000 g/mol and a vinyl content of 20-35%.

* * * * *